US009992542B2

(12) United States Patent
Shinohara et al.

(10) Patent No.: US 9,992,542 B2
(45) Date of Patent: Jun. 5, 2018

(54) INFORMATION PROCESSING APPARATUS, INFORMATION PROCESSING METHOD, PROGRAM, AND INFORMATION PROCESSING SYSTEM

(75) Inventors: Yuki Shinohara, Tokyo (JP); Miyako Terasawa, Tokyo (JP); Toshiya Hasegawa, Tokyo (JP); Yomei Otani, Tokyo (JP); Naoki Fukino, Tokyo (JP); Toshinari Nakamura, Tokyo (JP); Rajkumar Waghmare, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 114 days.

(21) Appl. No.: 13/565,961

(22) Filed: Aug. 3, 2012

(65) Prior Publication Data

US 2013/0042282 A1    Feb. 14, 2013

(30) Foreign Application Priority Data

Aug. 12, 2011 (JP) .................................. 2011-177009

(51) Int. Cl.
H04N 21/4725 (2011.01)
H04N 21/4782 (2011.01)
H04N 21/4788 (2011.01)

(52) U.S. Cl.
CPC ..... *H04N 21/4725* (2013.01); *H04N 21/4782* (2013.01); *H04N 21/4788* (2013.01)

(58) Field of Classification Search
CPC ................................................ H04N 21/8133
USPC ....................................................... 725/112
See application file for complete search history.

(56) References Cited

U.S. PATENT DOCUMENTS

| 6,505,160 B1* | 1/2003 | Levy et al. .................... 725/112 |
| 2002/0059602 A1* | 5/2002 | Macrae .............. H04N 5/44543 725/42 |
| 2002/0083464 A1* | 6/2002 | Tomsen et al. ................ 725/112 |
| 2002/0109706 A1* | 8/2002 | Lincke et al. ................ 345/700 |

(Continued)

FOREIGN PATENT DOCUMENTS

| JP | 2004-318475 A | 11/2004 |
| JP | 2009100006 A | 5/2009 |

OTHER PUBLICATIONS

Chinese Office Action and Search Report for Application No. 201210274656.3 dated Sep. 5, 2016.

*Primary Examiner* — Fernando Alcon
(74) *Attorney, Agent, or Firm* — Lerner, David, Littenberg, Krumholz & Mentlik, LLP

(57) ABSTRACT

An information processing apparatus including an execution unit, a generation unit, a first request unit, and a second request unit. The execution unit is capable of executing first information processing. The generation unit is configured to generate a display image including first information associated with first access information for accessing the execution unit and second information associated with second access information for accessing a server on a global network, the server being capable of executing second information processing. The first request unit is configured to request the execution unit to execute the first information processing based on the first access information associated with the first information. The second request unit is configured to request the server to execute the second information processing based on the second access information associated with the second information.

6 Claims, 14 Drawing Sheets

(56) References Cited

U.S. PATENT DOCUMENTS

| | | | |
|---|---|---|---|
| 2003/0115612 A1* | 6/2003 | Mao et al. | 725/136 |
| 2005/0005308 A1* | 1/2005 | Logan | G06Q 30/06 |
| | | | 725/135 |
| 2005/0278737 A1* | 12/2005 | Ma | H04N 5/4403 |
| | | | 725/40 |
| 2010/0017717 A1* | 1/2010 | Nakanishi | 715/719 |
| 2011/0162020 A1* | 6/2011 | Kahn et al. | 725/82 |

* cited by examiner

INFORMATION PROCESSING APPARATUS, INFORMATION PROCESSING METHOD, PROGRAM, AND INFORMATION PROCESSING SYSTEM

CROSS-REFERENCE TO RELATED APPLICATION

The present application claims priority from Japanese Patent Application No. JP 2011-177009 filed in the Japanese Patent Office on Aug. 12, 2011, the entire content of which is incorporated herein by reference.

BACKGROUND

The present disclosure relates to an information processing apparatus, an information processing method, a program, and an information processing system that are capable of using network services provided by a server on a global network.

From the past, television receivers and video apparatuses that are capable of connecting to the Internet and the like have been known. For example, Japanese Patent Application Laid-open No. 2004-318475 (hereinafter, referred to as Patent Document 1) discloses a television receiver that is capable of acquiring, from a server on the Internet, information corresponding to a television program that is currently being viewed (see, for example, paragraphs [0070] and [0071] in specification and FIG. 5 of Patent Document 1).

SUMMARY

It is considered that household electrical appliances capable of using network services provided by a server on a global network like the television receiver disclosed in Patent Document 1 will continue to prevail.

In view of the circumstances as described above, there is a need for an information processing apparatus, an information processing method, a program, and an information processing system that have high operability and are capable of using network services.

According to an embodiment of the present disclosure, there is provided an information processing apparatus including an execution unit, a generation unit, a first request unit, and a second request unit.

The execution unit is capable of executing first information processing.

The generation unit is configured to generate a display image including first information associated with first access information for accessing the execution unit and second information associated with second access information for accessing a server on a global network, the server being capable of executing second information processing.

The first request unit is configured to request the execution unit to execute the first information processing based on the first access information associated with the first information.

The second request unit is configured to request the server to execute the second information processing based on the second access information associated with the second information.

In the information processing apparatus, a display image including the first information associated with the first access information and the second information associated with the second access information is generated. The first access information is information used for accessing the execution unit of the information processing apparatus, and the execution unit is requested to execute the first information processing based on the first access information. The second access information is information used for accessing the server on the global network, and the server is requested to execute the second information processing based on the second access information. As described above, the executions of the first and second information processing are requested based on the first and second access information. As a result, user operability can be improved.

The information processing apparatus may further include a broadcast signal processor configured to receive a program of a channel selected from a plurality of channels by a user and output the program. In this case, the display image may include a display area for displaying the program, and the first information processing may include switch processing of the channels.

As described above, the display image including the first and second information may include a display area for displaying a program. For example, the channel switch processing is executed when a user selects the first information.

The first information processing may include analysis processing for music that is being played in the program.

The analysis processing for music that is being played in the program may be executed when the user selects the first information as described above, for example.

The first access information and the second access information may each be a URL (Uniform Resource Locator).

As described above, a URL may be used as the first and second access information. As a result, a webpage or the like in which a hyperlink to a URL of the server and a hyperlink to a URL of the execution unit exist can be generated as the display image.

According to an embodiment of the present disclosure, there is provided an information processing method including executing, by an execution unit, first information processing.

By a generation unit, a display image including first information associated with first access information for accessing the execution unit and second information associated with second access information for accessing a server on a global network is generated, the server being capable of executing second information processing.

By a first request unit, the execution unit is requested to execute the first information processing based on the first access information associated with the first information.

By a second request unit, the server is requested to execute the second information processing based on the second access information associated with the second information.

According to an embodiment of the present disclosure, there is provided a program that causes a computer to function as an execution unit, a generation unit, a first request unit, and a second request unit.

The execution unit is capable of executing first information processing.

The generation unit is configured to generate a display image including first information associated with first access information for accessing the execution unit and second information associated with second access information for accessing a server on a global network, the server being capable of executing second information processing.

The first request unit is configured to request the execution unit to execute the first information processing based on the first access information associated with the first information.

The second request unit configured to request the server to execute the second information processing based on the second access information associated with the second information.

According to an embodiment of the present disclosure, there is provided an information processing system including a first information processing terminal and a second information processing terminal.

The first information processing terminal is capable of executing first information processing.

The second information processing terminal is capable of being connected to the first information processing terminal via a local network and includes a generation unit, a first request unit, and a second request unit.

The generation unit generates a display image including first information associated with first access information for accessing the first information processing terminal and second information associated with second access information for accessing a server on a global network, the server being capable of executing second information processing.

The first request unit requests the first information processing terminal to execute the first information processing based on the first access information associated with the first information.

The second request unit requests the server to execute the second information processing based on the second access information associated with the second information.

As described above, the first information processing terminal that executes the first information processing and the second information processing terminal that is capable of generating a display image and requesting the first information processing terminal and the server to execute the information processing may be connected via the local network. As a result, operability of the user using the second information processing terminal can be improved.

According to an embodiment of the present disclosure, there is provided an information processing apparatus including a generation unit, a first request unit, and a second request unit.

The generation unit is configured to generate a display image including first information associated with first access information for accessing an information processing terminal on a local network, that is capable of executing first information processing, and second information associated with second access information for accessing a server on a global network, the server being capable of executing second information processing.

The first request unit is configured to request the information processing terminal to execute the first information processing based on the first access information associated with the first information.

The second request unit is configured to request the server to execute the second information processing based on the second access information associated with the second information.

As described above, according to the embodiments of the present disclosure, an information processing apparatus, an information processing method, a program, and an information processing system that have high operability and are capable of using network services can be provided.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

<First Embodiment>

Figure 1:
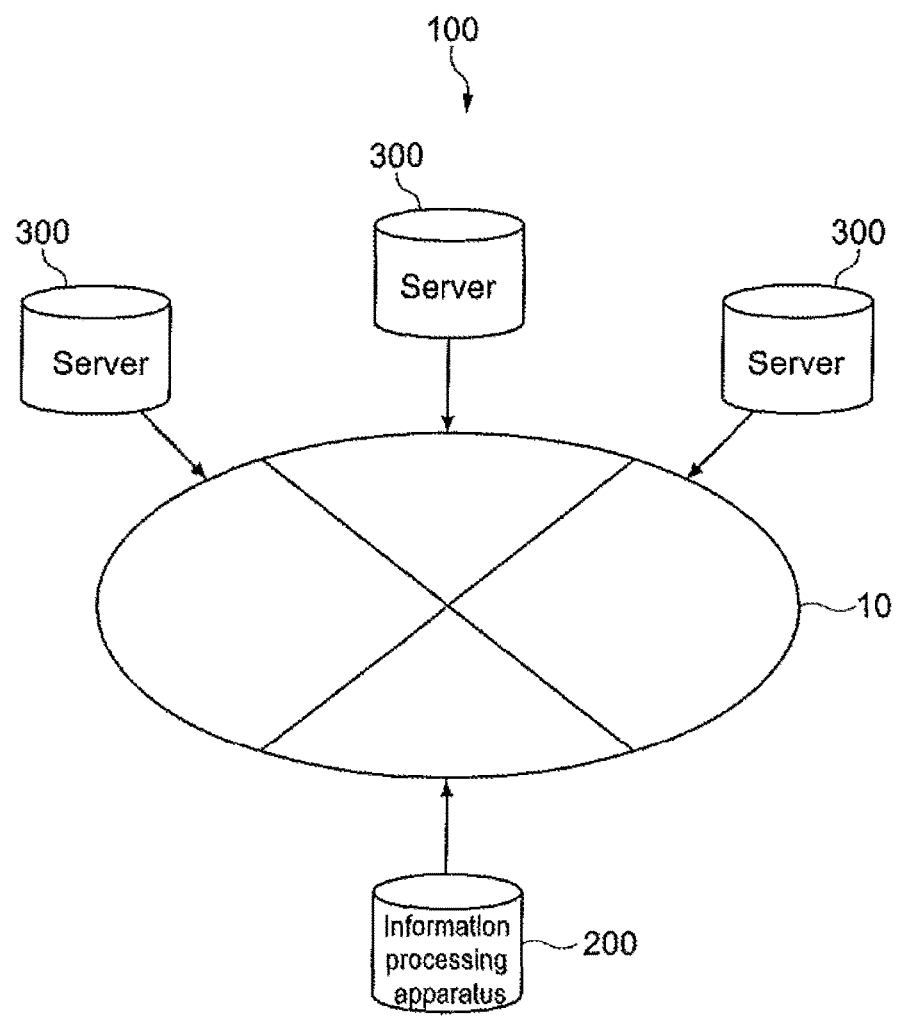
FIG. 1 is a schematic diagram showing a network system including an information processing apparatus according to a first embodiment of the present disclosure.

FIG. 1 is a schematic diagram showing a network system including an information processing apparatus according to a first embodiment of the present disclosure.

The network system 100 includes the Internet 10 as a global network and an information processing apparatus 200 of this embodiment connectable to the Internet 10. The network system 100 also includes a plurality of servers 300 capable of providing network services to the information processing apparatus 200 via the Internet 10.

The Internet 10 is typically a network that uses TCP/IP (Transmission Control Protocol/Internet Protocol), though global networks using other protocols may be used instead.

Examples of the network services provided to the information processing apparatus 200 from the servers 300 include provisions of movie contents, music contents, and the like, provisions of news information and the like, managements of online bulletin boards, intermediacies of online chats, and provisions of games, though not limited thereto. Various network services may be provided.

For example, the servers 300 uses the WWW (World Wide Web) system to open a website constituted of a plurality of webpages on the Internet 10. The webpage is an HTML (Hyper Text Markup Language) document, and information such as an image and music, hyperlinks to other webpages, and the like are embedded in the document. Moreover, in the webpage, a style sheet for enhancing design of a webpage, a script for allowing a function that cannot be realized by HTML to be exhibited, and the like are used. In this embodiment, Java (registered trademark) Script is used as a script language describing a script, though not limited thereto.

The information processing apparatus 200 requests a top page (one of webpages) of a website based on access information to the server 300, for example. The requested server 300 transmits an HTML document representing the top page, image data for structuring the top page, or the like to the information processing apparatus 200 as a response.

In this embodiment, a URL (Uniform Resource Locator) is used as the access information to the server 300. A request made based on the URL is transmitted to the server 300 from the information processing apparatus 200.

In addition to the request for acquiring a webpage described above, various requests based on URLs are transmitted from the information processing apparatus 200 to the servers 300. Based on the requests, various types of information processing are executed by the servers 300.

For example, based on a URL indicating a storage location of a content, program, or the like, transmission processing of the content, program execution processing, or the like is requested to the server 300. As a result, various network services are provided to the information processing apparatus 200 from the servers 300.

As described above, in this embodiment, the server 300 is requested to execute predetermined information processing (second information processing) based on a URL for accessing the server 300 (second access information).

In this embodiment, data communication is held between the information processing apparatus 200 and the servers 300 by HTTP (Hyper Text Transfer Protocol). In other words, an HTTP request is transmitted from the information processing apparatus 200 to the server 300 based on the URL. In response to the request, an HTTP response is transmitted from the server 300 to the information processing apparatus 200.

However, a communication protocol, a communication system, and the like used on the Internet 10 are not particularly limited, and various systems may be used. The number of servers 300 on the Internet 10 is also not particularly limited.

[Structure of Information Processing Apparatus]

Figure 2:
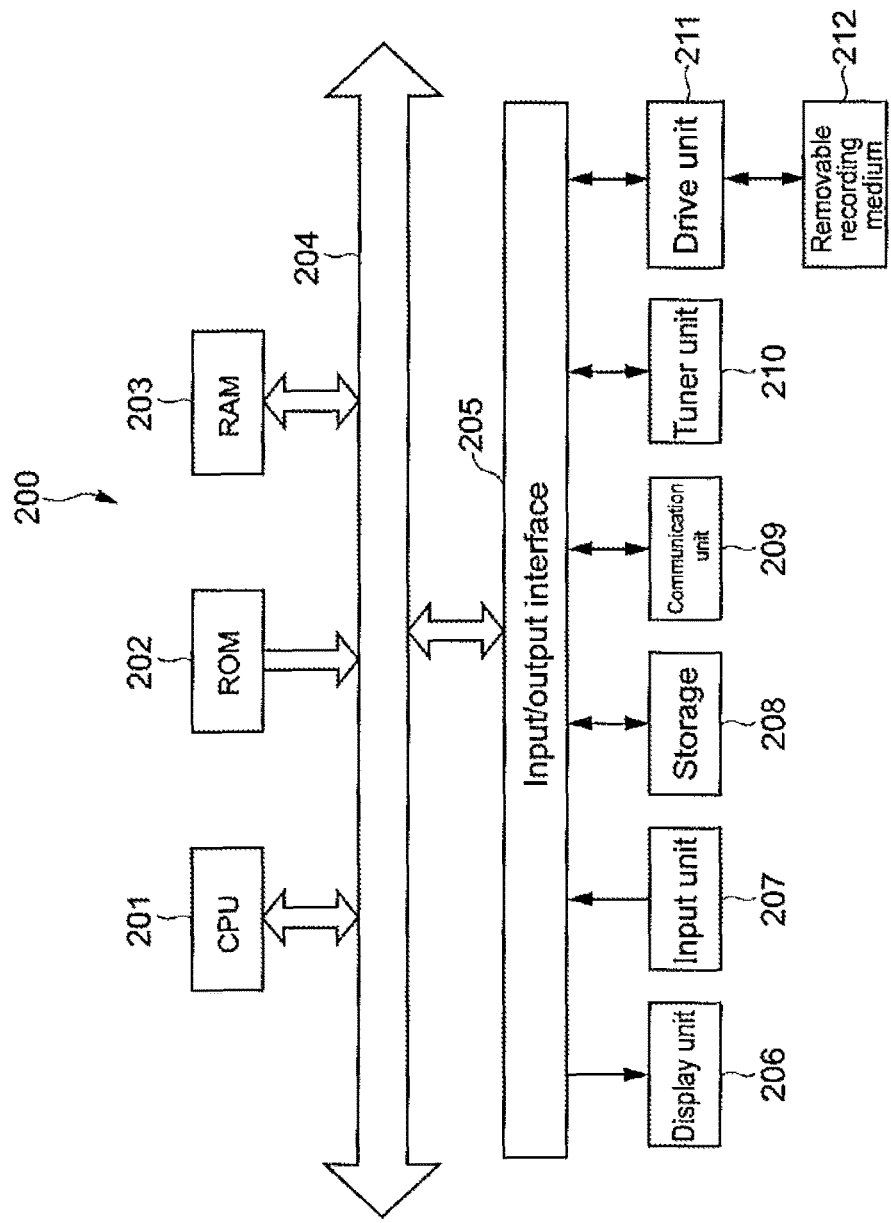
FIG. 2 is a block diagram schematically showing a structural example of the information processing apparatus shown in FIG. 1.

FIG. 2 is a block diagram schematically showing a structural example of the information processing apparatus 200 of this embodiment. As the information processing apparatus 200, various computers such as a PC (Personal Computer) are used. A television receiver, a BD (Blu-ray Disc) recorder, and the like connectable to the Internet 10 may also be used.

The information processing apparatus 200 includes a CPU (Central Processing Unit) 201, a ROM (Read Only Memory) 202, a RAM (Random Access Memory) 203, an input/output interface 205, and a bus 204 for mutually connecting those components.

The CPU 201 accesses the RAM 203 and the like as necessary and collectively controls the entire blocks of the information processing apparatus 200 while executing various types of operational processing. The ROM 202 is a nonvolatile memory that fixedly stores an OS (Operating System) to be run by the CPU 201 and firmware such as a program and various parameters. The RAM 203 is used as a working area of the CPU 201 and the like and temporarily stores the OS, various applications that are being executed, and various types of data that are being processed.

Connected to the input/output interface 205 are a display unit 206, an input unit 207, a storage 208, a communication unit 209, a tuner unit 210, a drive unit 211, and the like.

The display unit 206 is a display device that uses, for example, liquid crystal, EL (Electro-Luminescence), or CRT (Cathode Ray Tube).

The input unit 207 is, for example, a controller, a pointing device, a keyboard, a touch panel, or other operation apparatuses. When the input unit 207 includes the touch panel, the touch panel may be integrated with the display unit 206.

The storage 208 is a nonvolatile storage device and is, for example, an HDD (Hard Disk Drive), a flash memory, or other solid-state memories.

The tuner unit 210 receives content data of programs delivered from broadcast stations of, for example, digital terrestrial broadcast, CS digital broadcast, and BD digital broadcast and demodulates video signals and audio signals.

For example, a predetermined channel is selected from a plurality of channels using a remote controller as the input unit 207. The tuner unit 210 receives a program of the channel selected by the user and outputs it to the display unit 206. The tuner unit 210 functions as a broadcast signal processor in this embodiment.

The drive unit 211 is a device capable of driving a removable recording medium 212 such as an optical recording medium, a floppy (registered trademark) disk, a magnetic recording tape, and a flash memory. In contrast, the storage 208 is used as a device that is mounted on the information processing apparatus 200 in advance and mainly drives unremovable recording media in many cases.

The communication unit 209 is a modem, a router, or other communication apparatuses that are connectable to a LAN (Local Area Network), a WAN (Wide Area Network), and the like and used for communicating with other devices. The communication unit 209 may establish either wired or wireless communication. The communication unit 209 is provided separate from the information processing apparatus 200 in many cases.

Figure 3:
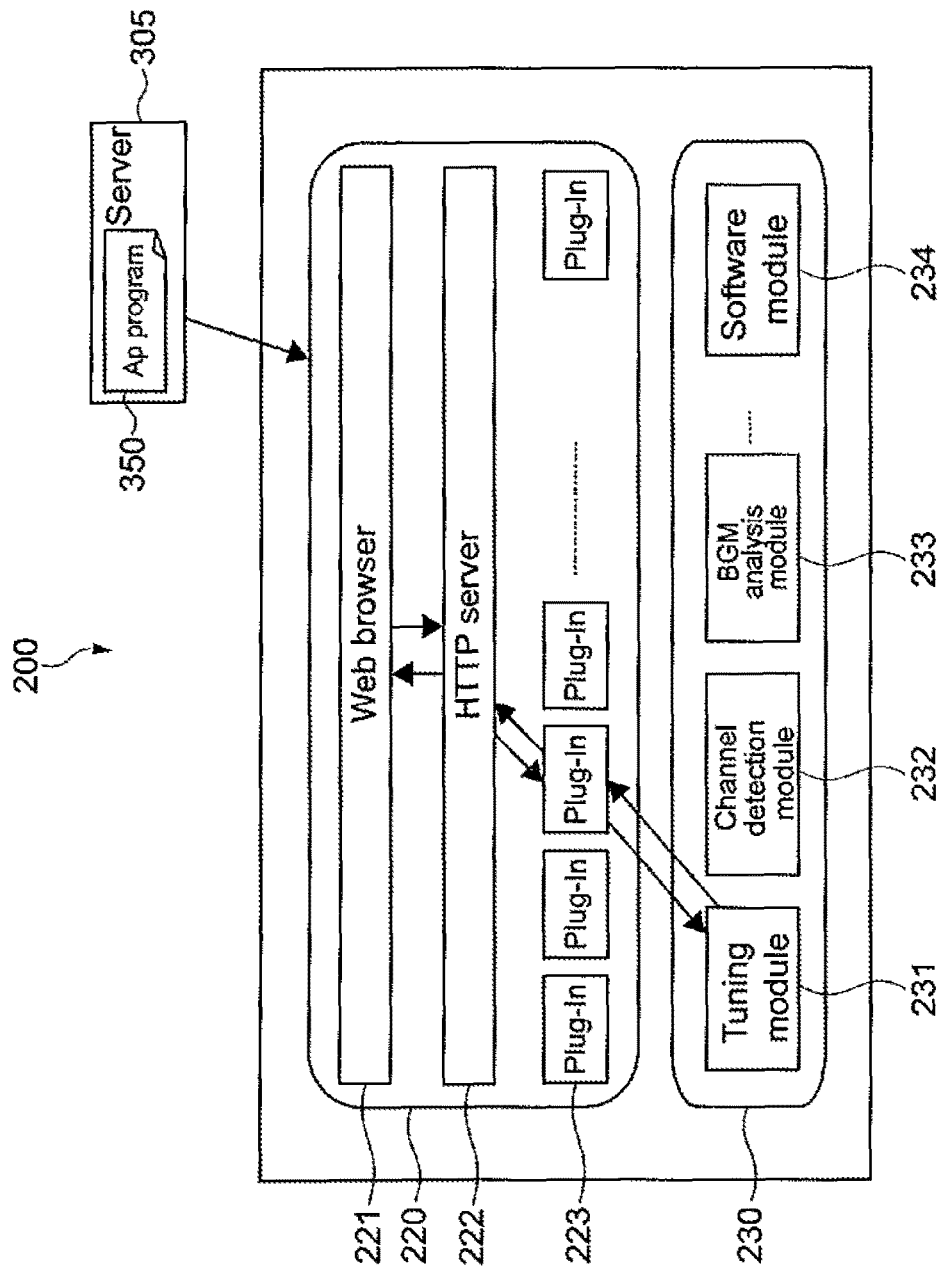
FIG. 3 is a block diagram schematically showing a structural example of software constituting the information processing apparatus shown in FIG. 1.

FIG. 3 is a block diagram schematically showing a structural example of software constituting the information processing apparatus 200. The blocks shown in FIG. 3 are realized by software resources such as a program stored in the ROM 202, the storage 208, and the like shown in FIG. 2 cooperating with hardware resources such as the CPU 201.

In the information processing apparatus 200 of this embodiment, viewing of programs delivered from broadcast stations and a usage of network services can be experienced seamlessly. For example, a broadcast program, a website on the Internet 10, and the like are searched seamlessly based on a search word input by the user. Moreover, while viewing a broadcast program, the user can acquire information on the program, contents related to the program, and the like from the Internet 10.

In addition, in the information processing apparatus 200 of this embodiment, network services having high operability as will be described later can be used. Therefore, the information processing apparatus 200 includes a service unit 220 and a framework 230 as shown in FIG. 3.

The service unit 220 includes a web browser 221, an HTTP server 222, and a plurality of plug-ins 223. The framework 230 includes a plurality of software modules 234 including a tuning module 231, a channel detection module 232, a music (BGM) analysis module 233.

The web browser 221 includes a protocol stack, an HTML engine, a drawing processor, and a script language processing engine (all of which are not shown). The protocol stack is used for communication via the Internet 10. The HTML engine interprets a webpage constituted of an HTML document. The drawing processor interprets a webpage, generates a display image, and outputs it to the display unit 206. The script language processing engine processes a script language in a webpage. In this embodiment, the web browser 221 functions as a generation unit.

By the web browser 221, an HTTP request is transmitted to the server 300 on the Internet 10 based on the URL. The web browser 221 receives an HTTP response from the server 300 and executes predetermined processing.

The web browser 221 also requests the HTTP server 222 to execute predetermined information processing (first information processing) based on a URL as access information for accessing the HTTP server 222 (first access information).

In other words, by the web browser 221, the HTTP request is transmitted to the HTTP server 222 based on the URL. The web browser 221 functions as first and second request units in this embodiment.

As the URL used as the access information with respect to the HTTP server 222, the following URLs including "localhost" and "local loopback address (127.0.0.1)" are used, for example.

http://127.0.0.1:{port number}/{API name} . . .
http://localhost:{port number}/{API name} . . .

The HTTP server 222 receives the request based on the URL as described above, interprets the URL, and executes the requested first information processing. Then, the HTTP server 222 transmits the processing result to the web browser 221 as a response. The HTTP server 222 functions as an execution unit in this embodiment.

Now, an execution operation of the first information processing by the HTTP server 222 will be described. As shown in FIG. 3, the plurality of plug-ins 223 are set in this embodiment. The plug-ins 223 are each used as an API (Application Program Interface).

The HTTP server 222 hands over processing to a predetermined plug-in based on the {API name} included in the URL. As a result, the plug-in 223 requests an operation to a predetermined software module 234 in the framework 230. The software module 234 that has received the request operates predetermined software or a predetermined device. The first information processing by the HTTP server 222 is executed as described above.

It should be noted that the execution operation of the first information processing is not limited to that described above.

[Operation of Information Processing Apparatus]

Figure 4:
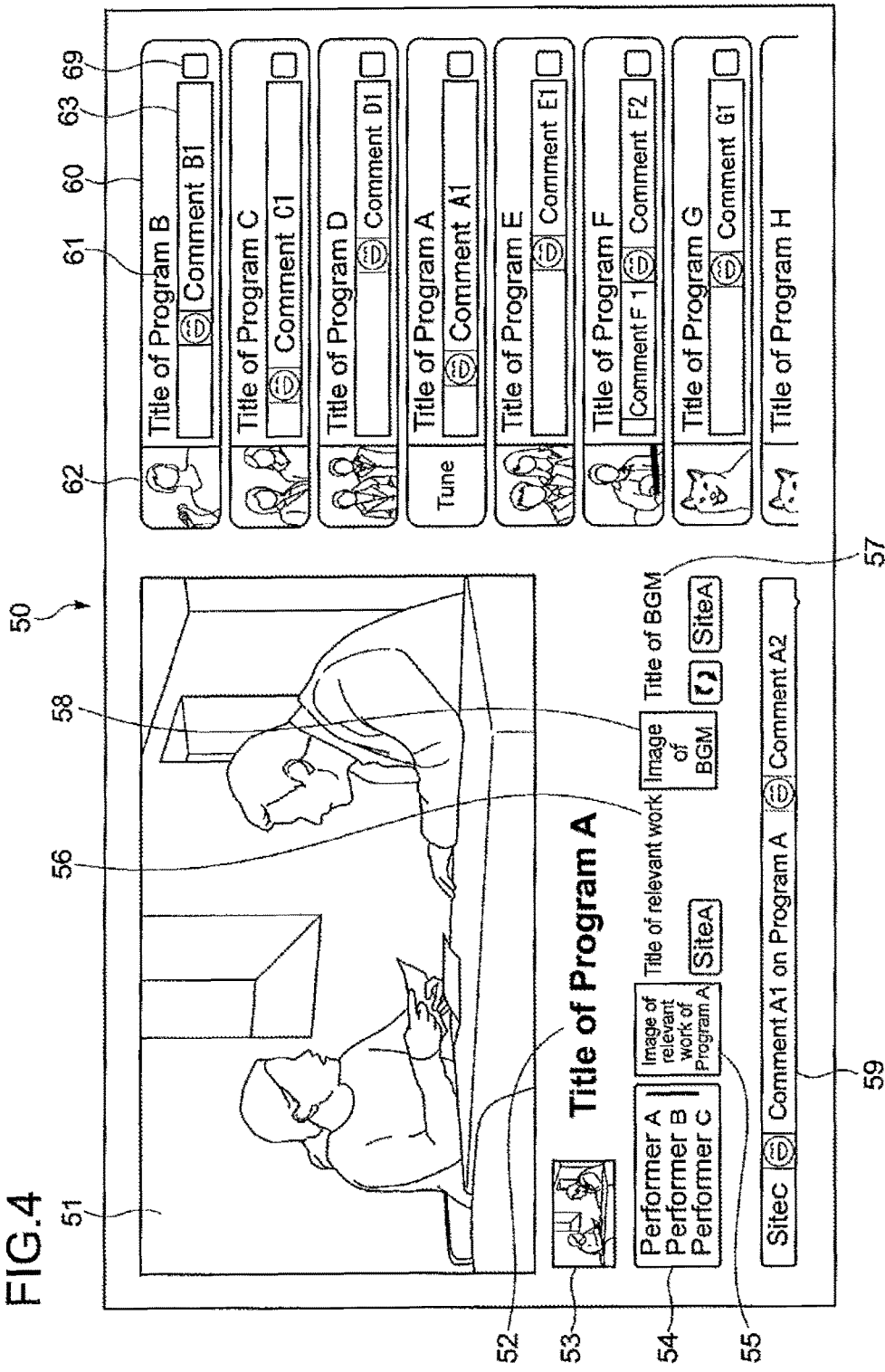
FIG. 4 is a schematic diagram showing an example of a display image generated by a web browser shown in FIG. 3.

An operation of the information processing apparatus 200 of this embodiment will be described. FIG. 4 is a schematic diagram showing an example of a display image generated by the web browser 221 in this embodiment.

In this embodiment, an instruction to execute an application according to the present disclosure is input by the user via a remote controller as the input unit 207. As a result, a program 350 for executing the application according to the present disclosure is downloaded to the information processing apparatus 200 from a predetermined server 305 on the Internet 10 as shown in FIG. 3, for example.

The web browser 221 of the information processing apparatus 200 executes the following processing including generation processing of a display image 50 shown in FIG. 4 based on the downloaded program 350. It should be noted that the program 350 for executing the application may be stored in the storage 208 or the like in advance.

As shown in FIG. 4, the display image 50 includes a display area 51 for displaying Program A of a channel selected by the user. Also in the display image 50, various types of information related to Program A are displayed.

In this embodiment, a title 52 of Program A, a thumbnail image 53 of Program A, cast names 54 of Program A, a thumbnail image 55 of a work related to Program A, and a title 56 of the work are displayed on a lower side of the display image 50. Also in the display image 50, a title 57 of music (BGM) played in Program A, a thumbnail image 58 of the music, and a comment 59 related to Program A are displayed.

A list 60 of other programs is displayed on a right side of the display image 50. Specifically, titles 61 of Programs B to H of other channels, thumbnail images 62 of Programs B to H, and comments 63 on Programs B to H are displayed. It should be noted that as the thumbnail image of a program, an image of one scene of the program is used, for example. Alternatively, a logo of the program or a broadcast station broadcasting the program, or the like is used.

In this embodiment, the URL for accessing the HTTP server 222 is linked to the thumbnail images 62 of programs of other channels out of the information items described above. Specifically, a hyperlink to the URL is set to the thumbnail images 62. Therefore, in this embodiment, the thumbnail images 62 of programs of other channels correspond to first information associated with the first access information for accessing the HTTP server 222.

Hyperlinks to the URLs for accessing the servers 300 on the Internet 10 are set to other information items in the display image 50. In other words, those information items correspond to second information associated with the second access information for accessing the servers 300 on the Internet 10 in this embodiment.

In this embodiment, when the user selects one of the thumbnail images 62 of programs of other channels, switch processing to the selected channel is executed by the HTTP server 222. The channel switch processing is executed as the first information processing. As a result, the program displayed in the display area 51 of the display image 50 is changed.

Figure 5:
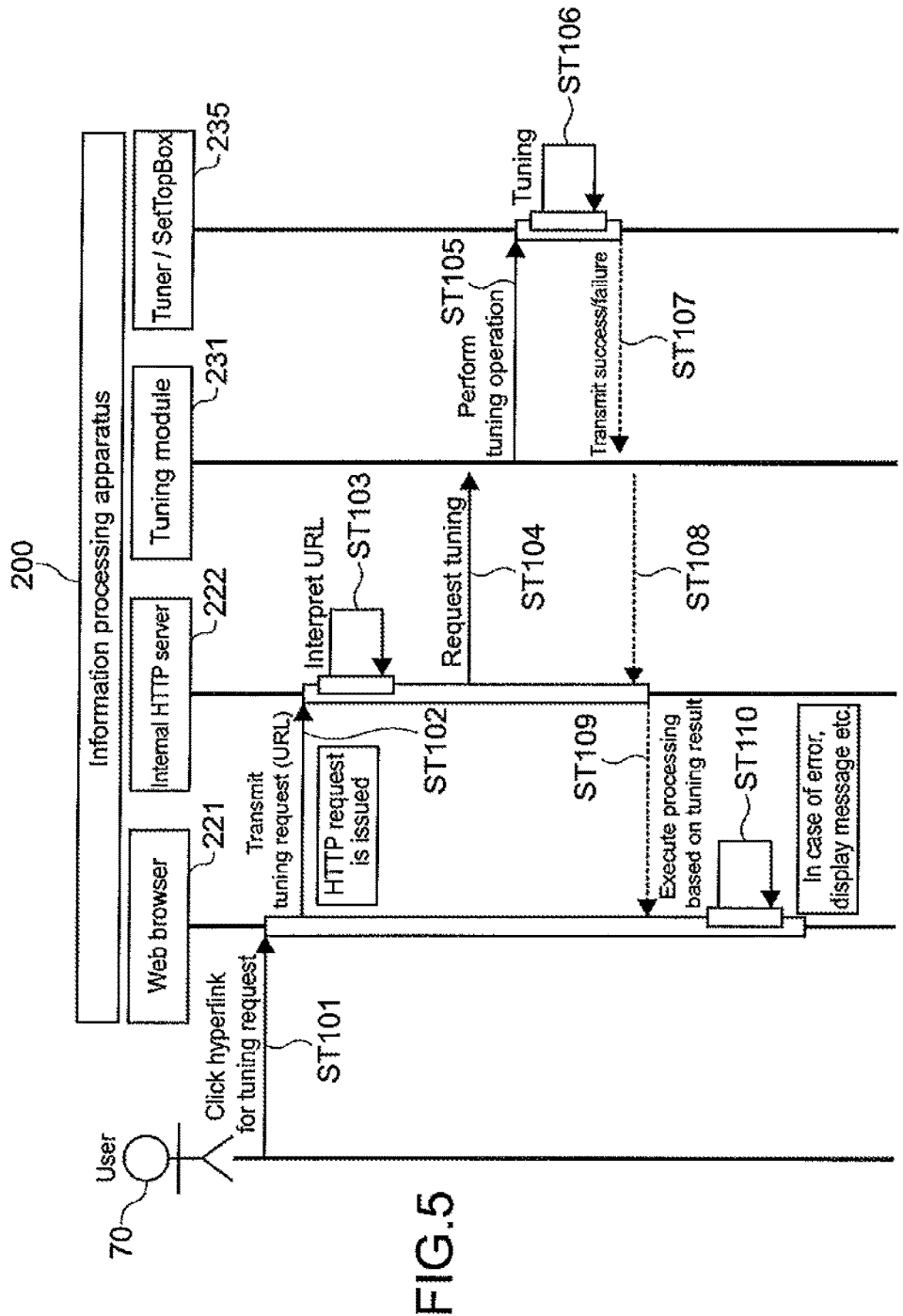
FIG. 5 is a sequence diagram schematically showing a flow of channel switch processing according to the first embodiment.

FIG. 5 is a sequence diagram schematically showing a flow of the channel switch processing.

A user 70 clicks the image 62 of a program of a channel that he/she wishes to view. For example, a pointer (not shown) or the like exists on the display image 50, and the image 62 is clicked using the pointer or the like. Alternatively, the image 62 may be displayed in focus as a selection target and clicked when a button or the like is pressed in that state. As a result, a hyperlink for requesting tuning, that is linked to the image 62, is clicked (Step 101).

By the web browser 221, an HTTP request is output to the HTTP server 222 based on the URL hyperlinked to the image 62 of another program (Step 102). The HTTP server 222 that has received the request interprets the URL (Step 103) and hands over the processing to a predetermined plug-in 223. Then, a tuning operation is requested to the tuning module 231 in the framework 230 from the plug-in 223 (Step 104).

The tuning module 231 that has received the tuning operation request operates software that executes tuning processing or a device 235 that executes the tuning processing to execute the tuning processing (Step 105). As a result, the channel switch processing (tuning processing) to a program that the user wishes to view is executed (Step 106).

It should be noted that the "tuner" shown in FIG. 5 corresponds to the software that executes the tuning processing, and the "SetTopBox" corresponds to the device that executes the tuning processing. The tuning processing may be executed either by the software or device as described above.

The result of the tuning processing is transmitted to the tuning module 231 from the "tuner" or "SetTopBox" (Step 107). In other words, information indicating a tuning success or error is transmitted to the tuning module 231.

The tuning result is also transmitted to the HTTP server 222 from the tuning module 231 (Step 108), and an HTTP response is output to the web browser 221 from the HTTP server 222 based on the tuning result (Step 109).

The web browser 221 that has received the HTTP response executes predetermined information processing based on the tuning result (Step 110). For example, when a response indicating a tuning processing success is received, a program of the switched channel is displayed in the display area 51. When a response indicating a tuning processing error is received, display indicating an error of the channel switch processing, for example, is output to the display unit 206.

It should be noted that the first information processing executed by the HTTP server 222 is not limited to the channel switch processing. For example, a channel of a program currently displayed in the display area 51 may be detected using the channel detection module 232 included in the framework 230 shown in FIG. 3.

For example, when the channel switch processing is a success, the web browser 221 requests the HTTP server 222 to execute detection processing of the channel of the changed program. As a result, predetermined software or device is operated by the channel detection module 232, and the detection processing of the channel being viewed is executed. When the detection processing is a success, information of the detected channel is transmitted to the web browser 221.

Then, the web browser 221 transmits the information of the channel to the server 305 shown in FIG. 3 or the like. At this time, the web browser 221 also transmits a request to the server 305. Specifically, a request for acquiring information on a program that is currently being broadcasted at that channel, a thumbnail image of the program, and various types of information related to the program is transmitted.

Based on the acquisition request for the program information, relevant information, and the like, the server 305 returns various types of information requisite for generating the display image 50 shown in FIG. 4 to the web browser 221. Accordingly, the display image 50 that is based on the program newly displayed in the display area 51 is generated by the web browser 221. In other words, the display image 50 in which information related to the newly-displayed program is displayed is generated.

The channel detection processing is also executed when the display image 50 is generated for the first time since the application of the present disclosure is executed. In this case, a channel detection request is transmitted from the web browser 221 to the HTTP server 222 when the user 70 instructs to execute the application.

The detected channel information is transmitted from the HTTP server 222 to the web browser 221. The web browser 221 transmits the channel information to the server 305 on the Internet 10 together with various requests.

From the server 305, information on the application program 350, an image for generating the display image 50, and the like is returned to the web browser 221. Alternatively, a URL of another server 300 that stores information requisite for the web browser 221 to generate the display image 50 may be returned, for example. Based on the information items, the display image 50 is generated by the web browser 221.

Without being limited to the case where a URL hyperlinked to the display image 50 is selected as described above, a request may be transmitted from the web browser 221 to the HTTP server 222.

Moreover, analysis processing of music that is being played in the program displayed in the display area 51 may be executed using the BGM analysis module 233 included in the framework 230, for example.

In this embodiment, the BGM analysis module 233 generates a character string corresponding to the music being played as an analysis result. The analysis result is returned to the web browser 221.

The web browser 221 transmits the received analysis result to a predetermined server 300 on the Internet 10 together with a request. As a result, the server 300 acquires information on a BGM corresponding to the character string as the analysis result and returns the information to the web browser 221.

The BGM information is acquired as described above so that the title 57 of the music that is being played in the program displayed in the display area 51 and the thumbnail image 58 of the music are displayed in the display image 50. It should be noted that a request for acquiring the thumbnail image 58 of music or the like may be transmitted again to the server 305 or the like.

As described above, any information processing may be executed as the first information processing executed by the HTTP server 222. For example, activation processing of a predetermined application stored in the storage 208 or the like may be executed as the first information processing.

In this embodiment, the plug-ins 223 shown in FIG. 3 are generated as appropriate by, for example, Java (registered trademark) Script. The software modules 234 in the framework 230 are used as appropriate via the plug-ins 223. As a result, information processing to be executed as the first information processing can be set as appropriate.

Figure 6:
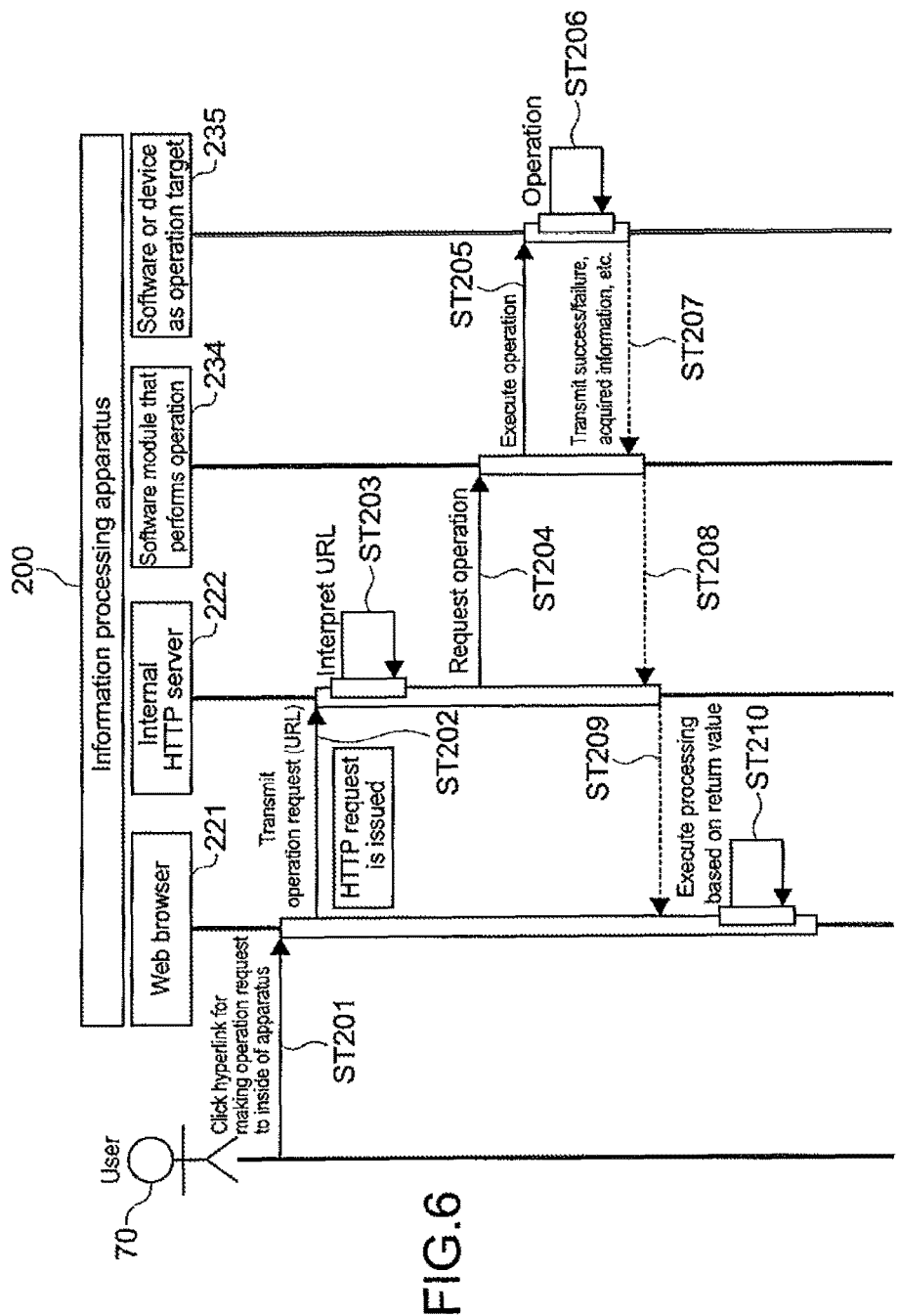
FIG. 6 is a sequence diagram schematically showing a flow of first information processing according to the first embodiment.

FIG. 6 is a sequence diagram schematically showing a flow of the first information processing of this embodiment. The user 70 first clicks a hyperlink for making an operation request to the inside of the information processing apparatus 200 (Step 201). For example, an image, characters, or the like to which a URL as the access information for accessing the HTTP server 222 is hyperlinked is selected. Alternatively, the URL may be displayed as it is on the display image 50 to be clicked.

Based on the URL, the web browser 221 outputs an HTTP request to the HTTP server 222 (Step 202). The HTTP server 222 that has received the request interprets the URL (Step 203) and hands over the processing to a predetermined plug-in 223. Then, the plug-in 223 requests an operation to a predetermined software module 234 in the framework 230 (Step 204).

The software module 234 that has received the operation request operates the software that executes the processing or the device 235 that executes the processing to thus execute the processing (Steps 205 and 206).

From the software or device 235 as the operation target, a processing result is returned to the software module 234 (Step 207). The processing result is information indicating a processing success or error. Alternatively, in a case where the first information processing requested by the HTTP server 222 is an acquisition of predetermined information, the acquired information or the like is returned as the processing result.

The processing result is also transmitted from the software module 234 to the HTTP server 222 (Step 208) so that an HTTP response is output from the HTTP server 222 to the web browser 221 based on the processing result (Step 209).

The web browser 221 that has received the HTTP response executes predetermined information processing based on a return value (information indicating success or error, acquired information, etc.) as the processing result (Step 210).

It should be noted that the software structure, sequence, and the like for executing the first information processing by the HTTP server 222 are not limited to those shown in FIGS. 3, 6, and the like. The plug-ins 223 do not need to be used, for example. Arbitrary software, hardware, and the like may be used as appropriate for executing the first information processing.

Figure 7:
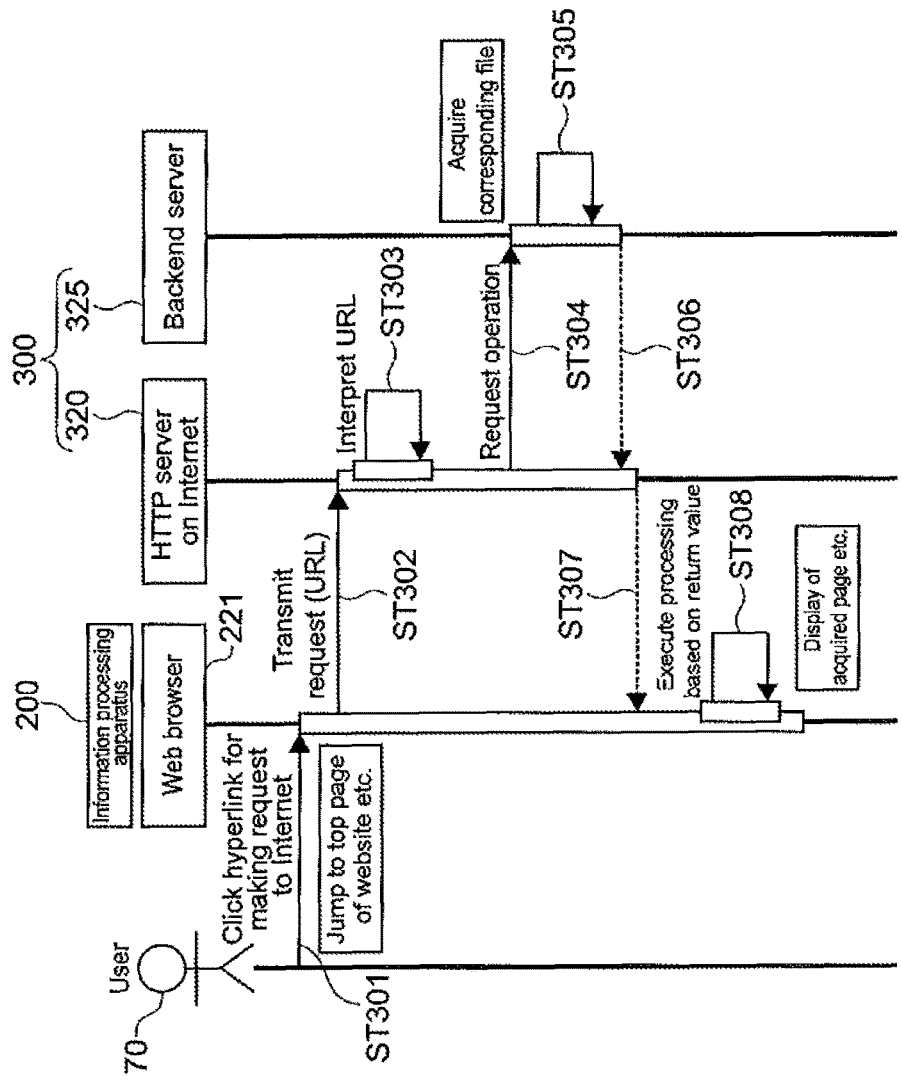
FIG. 7 is a sequence diagram schematically showing a flow of second information processing carried out by a server on the Internet shown in FIG. 1.

FIG. 7 is a sequence diagram schematically showing a flow of the second information processing carried out by the server 300 on the Internet 10. Here, a case where the user 70 wishes to display a top page of a predetermined website will be taken as an example.

The user 70 first clicks a hyperlink for making an operation request to the server 300 on the Internet 10 (Step 301). For example, the title 52 of Program A shown in FIG. 4 is clicked. It should be noted that the hyperlinked URL is a URL of a top page of a website.

Based on the URL, the web browser 221 transmits an HTTP request to an HTTP server 320 on the Internet 10 (Step 302). The HTTP server 320 that has received the request interprets the URL (Step 303) and requests an operation to a backend server 325 (Step 304).

It should be noted that the HTTP server 320 and the backend server 325 are included in the servers 300 on the Internet 10 shown in FIG. 1 and the like. For example, the HTTP server 320 and the backend server 325 may be realized by a single terminal. Alternatively, the HTTP server 320 and the backend server 325 may be realized separately by a plurality of apparatuses connected via a network such as the Internet 10 and the LAN. In this case, the plurality of apparatuses function as the servers 300.

The backend server 325 that has received the operation request executes the second information processing (Step 305). Accordingly, a file including an HTML document indicating a top page of a website is acquired.

A processing result is returned to the HTTP server 320 on the Internet 10 from the backend server 325 (Step 306). The processing result is, for example, the acquired file or information indicating an error in acquiring the file.

The processing result is transmitted as an HTTP response to the web browser 221 of the information processing apparatus 200 from the HTTP server 320 (Step 307). The web browser 221 that has received the HTTP response executes predetermined information processing based on a return value as the processing result (Step 308). Here, display of a top page of a website or the like is executed.

It should be noted that the second information processing executed by the server 300 on the Internet 10 is not limited at all. Various types of information processing for providing various network services to the information processing apparatus 200 may be executed as the second information processing as appropriate.

Here, an operation example of the information processing apparatus 200 at a time the second information displayed in the display image 50 shown in FIG. 4 is selected will be described.

Figure 8:
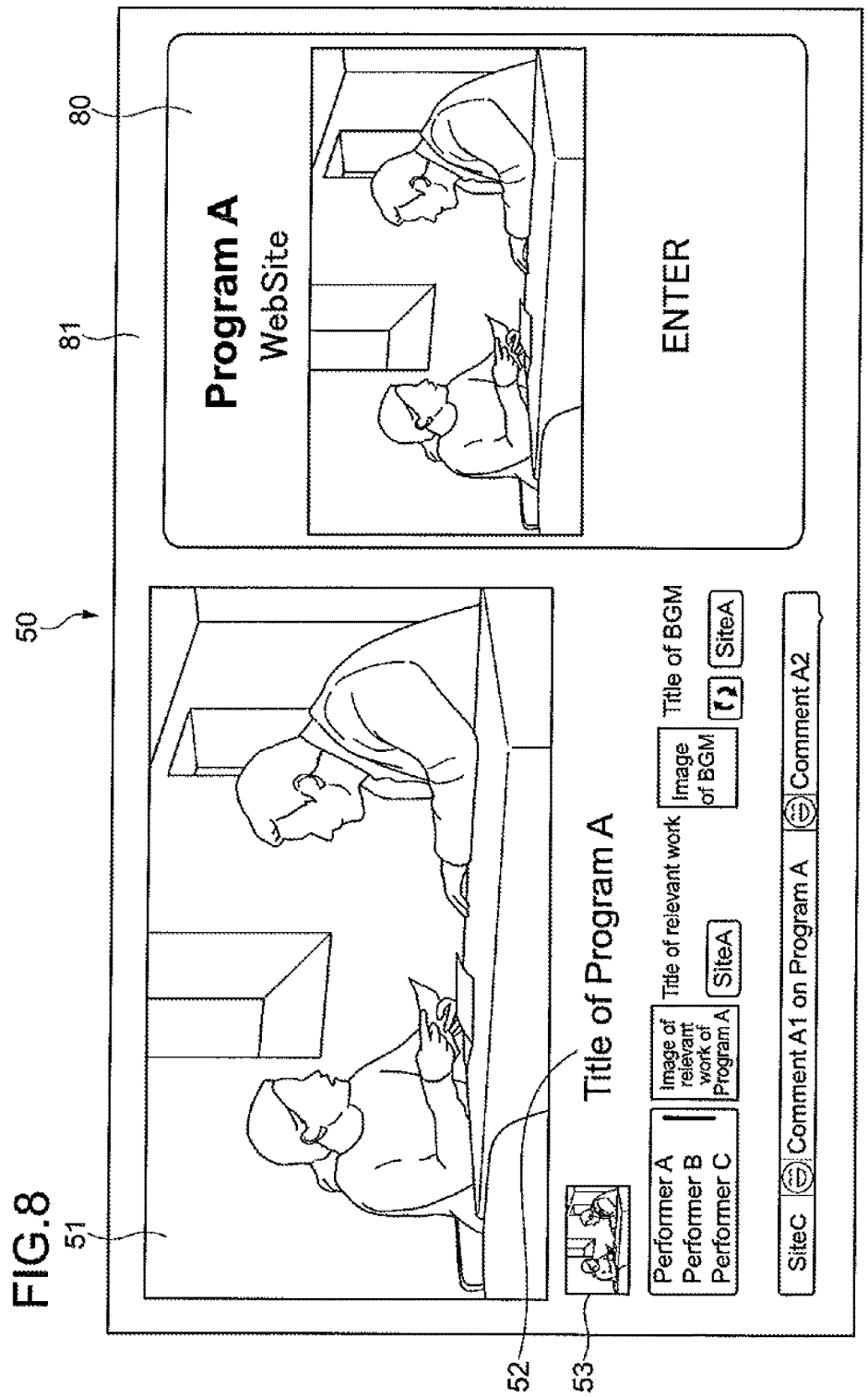
FIG. 8 is a schematic diagram showing a display image at a time a title of Program A in the display image shown in FIG. 4 and a thumbnail image of Program A are selected.

FIG. 8 is a schematic diagram showing the display image 50 at a time the title 52 of Program A in the display image 50 and the thumbnail image 53 of Program A are selected. In this embodiment, a URL of a top page 80 of a website of Program A is linked to the title 52 of Program A and the thumbnail image 53 of Program A. Alternatively, a URL of a page related to Program A in a website of a broadcast station broadcasting Program A may be linked.

As shown in FIG. 8, when the title 52 of Program A or the like is clicked, the top page 80 of the website of Program A is displayed in an area 81 on the right-hand side of the display image 50. Accordingly, the user can specifically check information on Program A and sufficiently enjoy viewing it.

For example, understanding of a content by a user or emotional involvement with respect to a content is expected to become profound. Further, since there is a difference in a knowledge range or interest range between a programmer and a user, an expression that cannot be understood by a user may be made in a program. Even in such a case, sufficient knowledge can be acquired from a website of the program, for example, so that the user can view the program while sufficiently grasping an intention of the programmer and the like.

Figure 9:
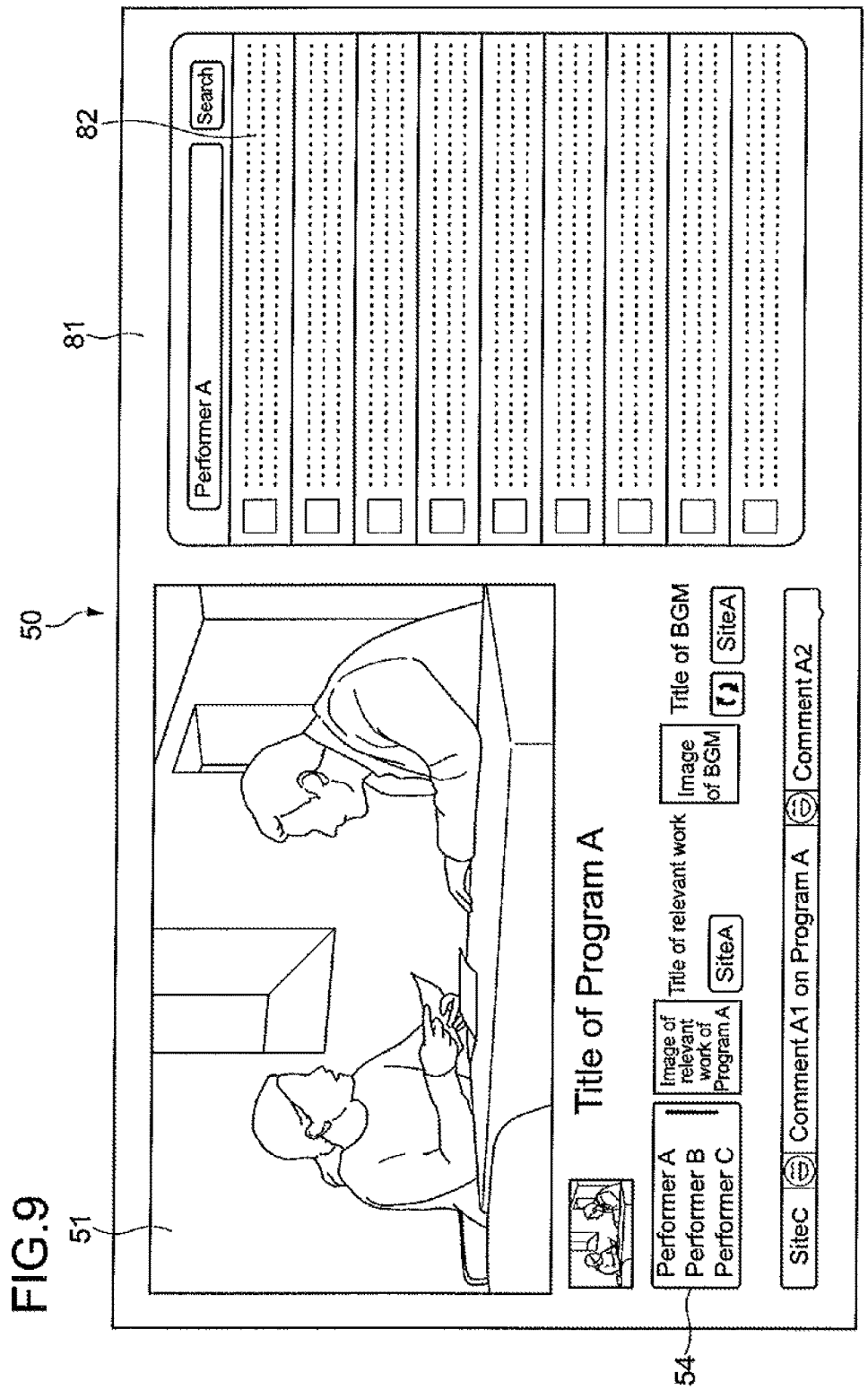
FIG. 9 is a schematic diagram showing the display image at a time one of cast names of Program A in the display image shown in FIG. 4 is selected.

FIG. 9 is a schematic diagram showing the display image 50 at a time one of the cast names 54 of Program A in the display image 50 is selected.

In this embodiment, a URL of the server 300 having a search engine capable of executing search processing based on a keyword is linked to each of the cast names 54, for example. To Performer A, a URL of a page that has been searched based on a keyword "Performer A" is linked. Such a URL is generated when Performer A is clicked, for example. Also to Performers B and C, URLs of pages as search results for Performers B and C are linked.

As shown in FIG. 9, when Performer A or the like is clicked, a webpage 82 showing a search result obtained based on the keyword "Performer A" is displayed in the area 81 on the right-hand side of the display image 50. Accordingly, the user can acquire information on a profile of Performer A, other works of Performer A, and the like. In other words, the user can more-specifically check the information on Performer A and sufficiently enjoy viewing Program A.

Figure 10:
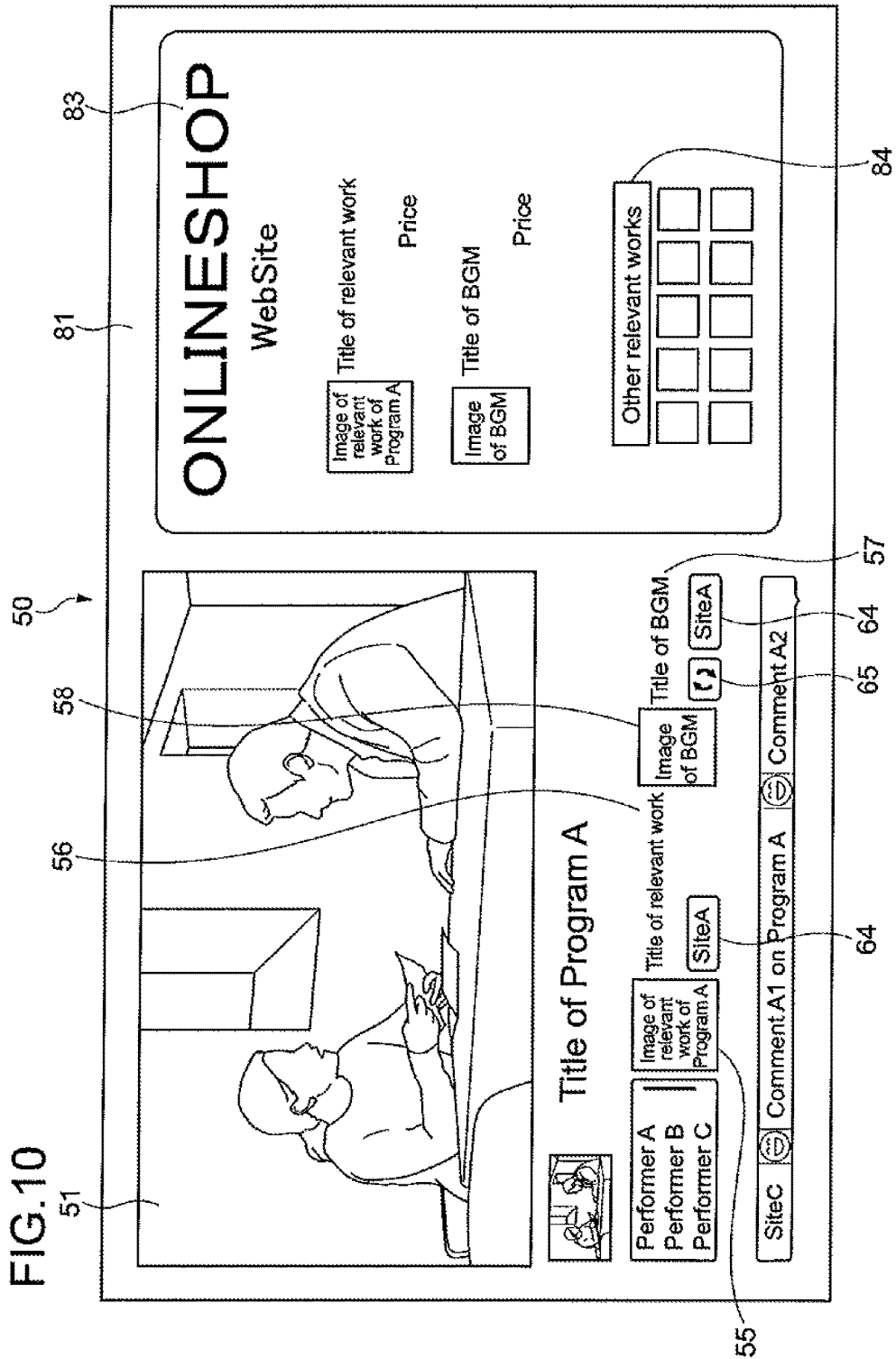
FIG. 10 is a schematic diagram showing the display image at a time a thumbnail image of a work related to Program A in the display image shown in FIG. 4, a title of the work, a title of music (BGM) played in Program A, and a thumbnail image of the music are selected.

FIG. 10 is a schematic diagram showing the display image 50 at a time the thumbnail image 55 of a work related to Program A in the display image 50, the title 56 of the work, the title 57 of music (BGM) played in Program A, and the thumbnail image 58 of the music are selected.

In this embodiment, URLs of websites at which video contents, music contents, and the like can be purchased online are linked to the images described above. In such websites, a content is designated by a user, and a predetermined purchase operation is executed. The purchased content is provided to the information processing apparatus 200 by, for example, streaming or download. Alternatively, a BD, a DVD, or the like onto which the content is recorded may be purchased online.

As shown in FIG. 10, when the thumbnail image 55 of the work related to Program A or the like is clicked, a webpage 83 of a website at which a content can be purchased is displayed in the area 81 on the right-hand side of the display image 50. The webpage 83 is a page for purchasing the work related to Program A or a BGM played in Program A.

As shown in FIG. 10, information 84 on other relevant products is also displayed in the webpage 83. As a result, the user can purchase a content related to Program A and sufficiently enjoy viewing Program A.

It should be noted that buttons 64 described as Site A are provided below the title 56 of a relevant product and the title 57 of a BGM in the display image 50. Site A is a website at which online purchase is possible. When the button 64 is pressed, a top page of a website is displayed. For example, by pressing the button 64 when wishing to purchase a content unrelated to Program A, the user can jump to a top page. As a result, user operability is improved.

Further, an update button 65 is provided below the title 57 of a BGM. For example, the user clicks the update button 65 when music played in the program changes. As a result, information on the BGM is updated. Specifically, when the update button 65 is clicked, a BGM analysis request is transmitted from the web browser 221 to the internal HTTP server 222. Therefore, the update button 65 corresponds to the first information, and a URL of the HTTP server 222 is linked thereto.

Figure 11:
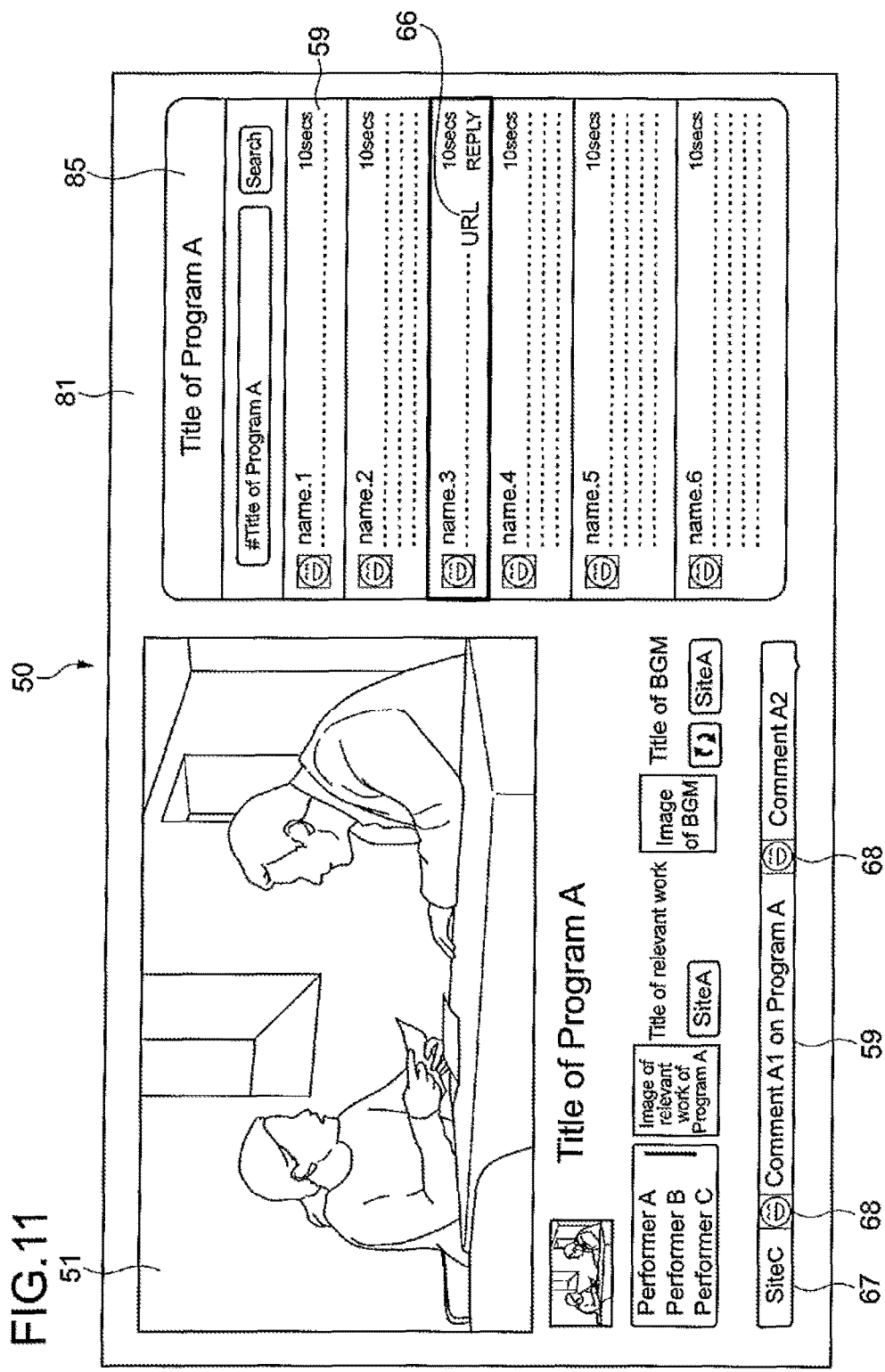
FIG. 11 is a schematic diagram showing the display image at a time a comment related to Program A in the display image shown in FIG. 4 is selected.

FIG. 11 is a schematic diagram showing the display image 50 at a time the comment 59 related to Program A in the display image 50 is selected.

First, the comment 59 will be described. As the network service provided by the server 300 on the Internet 10, there is a service of displaying comments posted by users in a time series. The posted comments are displayed in an area called timeline.

In this embodiment, Website C is opened by the server 300, and the user can use the service via Website C.

Such a service is a so-called communication service. For example, the user can display comments of other users in his/her own timeline and post a comment with respect to the comments of other users or browse responses thereto.

In FIGS. 4, 11, and the like, comments A1 and A2 are displayed as the comment 59. The comments A1 and A2 are comments on Program A that have been posted by users using the network service described above.

The comments A1 and A2 are searched and displayed as appropriate as comments on Program A. For example, when a comment includes a keyword related to Program A or the like, comments are searched for based on the keyword and displayed in the display image 50 in real time. The comments A1 and A2 are displayed in a scroll in a lateral direction, and a newly-posted comment is sequentially displayed in real time.

In this embodiment, the web browser 221 transmits a request to acquire information for displaying the comment 59 on Program A to the server 305 shown in FIG. 3. The information for displaying the comment 59 is, for example, a URL of a webpage in which the comment 59 on Program A is displayed in Website C.

When the URL is returned from the server 305, the web browser 221 transmits a request to acquire the comment 59 to the server 300 providing Website C based on the received URL.

Alternatively, a URL of a search page in Website C may be requested as the information for displaying the comment 59. The web browser 221 that has received the URL may request search processing for the comment 59 on Program A and an acquisition of a result thereof based on the URL.

In this embodiment, a URL of a webpage 85 in Website C is linked to the comment 59 on Program A. The webpage 85 is a page in which a list of comments 59 on Program A that have been searched for in Website C is displayed.

As shown in FIG. 11, when the comment 59 on Program A is clicked, the webpage 85 is displayed in the area 81 on the right-hand side of the display image 50. The displayed comments 59 are updated in real time.

As shown in FIG. 11, the comment 59 may sometimes include a URL 66. By clicking the URL 66, the user can jump to a top page of a predetermined website, for example.

When a button 67 described as Site C in FIG. 11 is clicked, a top page of Website C is displayed in the area 81. Alternatively, a timeline of the user may be displayed.

Further, as shown in FIG. 11, thumbnail images 68 such as a face and a character are displayed in the comments A1 and A2. The thumbnail images 68 are each an icon that a user who posts the comment can freely set. Therefore, although the same image is illustrated as the thumbnail images 68 in FIGS. 4, 11, and the like, different images are used for different users in actuality.

The icons are hyperlinked to timelines of respective users. Therefore, when the icon is clicked, a timeline of a corresponding user is displayed in the area 81 on the right-hand side of the display image 50.

Since the user can use such a service while viewing Program A displayed in the display area 51, evaluations of other people on Program A, maniacal information on Program A, and the like can be acquired so that the user can sufficiently enjoy viewing Program A.

Further, since a feeling of viewing Program A with a large number of other users posting the comments can be obtained, liveliness and a level of excitement can be increased. In addition, by viewing the comments of other users, it is possible to grasp a content that is currently drawing attention.

Next, the list 60 of other programs being broadcasted shown in FIG. 4 will be described. As described above, when one of the thumbnail images 62 of other programs is clicked, the channel switch processing is executed by the internal HTTP server 222.

When the titles 61 of Programs B to H of other channels and the comments 63 on Programs B to H of other channels are clicked, a list of the comments 63 on the clicked program is displayed. In other words, a webpage showing a list of the comments 63 that is almost the same as the webpage 85 shown in FIG. 11 is displayed. As a result, evaluations, information, and the like of other Programs B to H can be viewed.

When a button 69 displayed on the right-hand side of the comment 63 for each of Programs B to H (see FIG. 4) is clicked, a top page of a website or a timeline screen is displayed.

The network services described with reference to FIGS. 8 to 11, changes of UIs (User Interfaces) of the display image 50 based on the services, and the like are mere examples and are not limited at all. In FIGS. 8 to 11, the top page and the like have been displayed in the area 81 on the right-hand side of the display image 50. However, a screen may shift from the display image 50 to a top page or the like every time a hyperlink is clicked. Further, the structure of the display image 50 including the position and size of the display area 51 in which a program is displayed is also not limited at all. By appropriately selecting the hyperlinked URL, a desired network service can be used.

In the information processing apparatus 200 of this embodiment, the display image 50 including the first information associated with a URL as the first access information and the second information associated with a URL as the second access information is generated. The URL as the first access information is information for accessing the HTTP server 222 of the information processing apparatus 200, and the HTTP server 222 is requested to execute the first information processing based on the URL. The URL as the second access information is information for accessing the server 300 on the Internet 10 as the global network, and the server 300 is requested to execute the second information processing based on the URL.

Accordingly, by appropriately setting the URLs as the second access information, various network services can be provided by the servers 300 on the Internet 10. In addition, it becomes possible to request the HTTP server 222 as the execution unit of its own to execute the first information processing using hyperlinks to the URLs as the first access information.

As a result, the processing request to the servers 300 on the Internet 10 and the processing request to the internal HTTP server 222 can both be realized using HTTP. Accordingly, the display image 50 in which a hyperlink to the server 300 on the Internet 10 and a hyperlink to the internal HTTP server 222 exist can be generated as a single webpage described in HTML.

By operating the thus-generated display image 50, the user can use various network services while making a channel switch operation, a music analysis operation, and the like. As a result, operability of the user using the information processing apparatus 200 can be improved. Moreover, a usability range can be widened.

In the display image 50, the UI for accessing a website on the Internet 10 or the like (second information) and the UI for making an operation to the information processing apparatus 200 itself (first information) exist seamlessly. As a result, operability and understandability of an application are improved. Therefore, user operability can be improved.

Also in this embodiment, the program 350 for executing an application, including the generation processing of the display image 50, is stored in the server 305 shown in FIG. 3. By downloading the program 350 in the information processing apparatus 200, the operation described above is executed. Therefore, it is possible to appropriately execute the change or upgrade of the program 350 and the like on the server 305 side. As a result, operability of the user using the information processing apparatus 200 can be improved.

It should be noted that HTTP, HTML, and the like are well-known techniques, and by using such techniques as appropriate, a general versatility of the technique described above can be enhanced. For example, the application program 350 can be easily produced as appropriate according to a specification of an apparatus that is to execute the services described above.

<Second Embodiment>

An information processing apparatus and information processing system according to a second embodiment of the present disclosure will be described. In descriptions below, descriptions on parts having the same structures and operations as those of the network system 100 and the information processing apparatus 200 that have been described in the above embodiment will be omitted or simplified.

Figure 12:
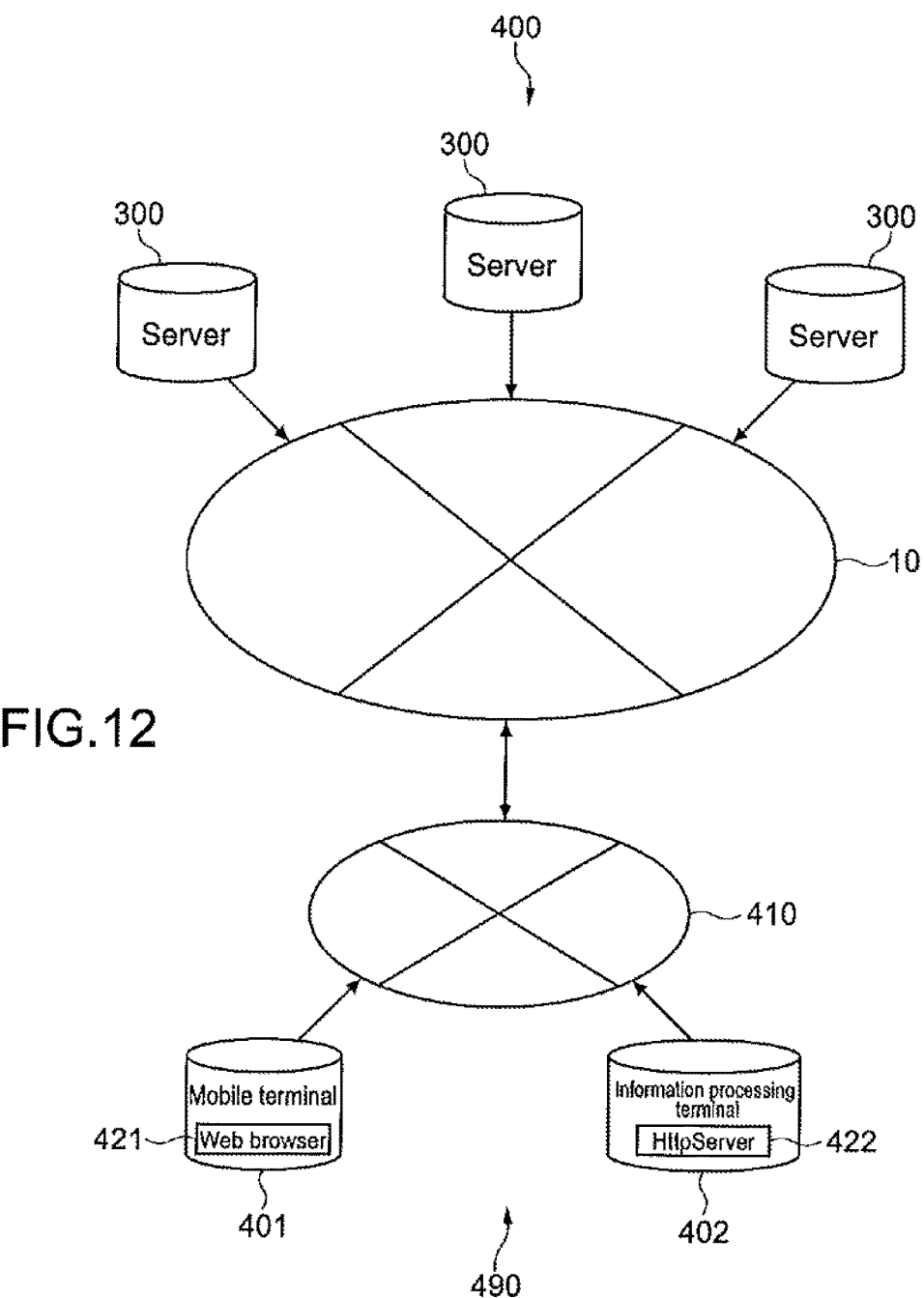
FIG. 12 is a schematic diagram showing a network system including an information processing apparatus and an information processing system according to a second embodiment of the present disclosure.

FIG. 12 is a schematic diagram showing a network system including an information processing apparatus and an information processing system according to this embodiment.

The network system 400 includes the Internet 10 as the global network and the plurality of servers 300 connected to the Internet 10. The plurality of servers 300 are capable of providing network services.

As shown in FIG. 12, the network system 400 includes a mobile terminal 401 and an information processing terminal 402 that are connected via a local network 410. The mobile terminal 401 and the information processing terminal 402 are connected to the Internet 10 via the local network 410.

The mobile terminal 401 functions as a second information processing terminal in this embodiment and also corresponds to the information processing apparatus in this embodiment. The information processing terminal 402 functions as a first information processing terminal in this embodiment. An information processing system 490 of this embodiment is realized by the mobile terminal 401 and the information processing terminal 402.

As shown in FIG. 3, in the first embodiment, the information processing apparatus 200 has included the web browser 221 and the HTTP server 222, and a request has been transmitted from the web browser 221 to the HTTP server 222 based on the URL of the HTTP server 222.

In this embodiment, as shown in FIG. 12, the information processing system 490 is realized by the mobile terminal 401 including a web browser 421 and the information processing terminal 402 including an HTTP server 422.

The web browser 421 generates a display image including first information associated with a URL for accessing the information processing terminal 402 capable of executing the first information processing (first access information) and second information associated with a URL for accessing the server 300 on the Internet 10 that is capable of executing the second information processing (second access information).

The web browser 421 requests the information processing terminal 402 to execute the first information processing based on the URL associated with the first information. Specifically, the web browser 421 requests the HTTP server 422 of the information processing terminal 402 to execute the first information processing. The web browser 421 also requests the server 300 to execute the second information processing based on the URL associated with the second information.

The web browser 421 functions as the generation unit, the first request unit, and the second request unit in this embodiment.

Examples of the first and second information processing include those described in the first embodiment. Examples of the first and second information also include those described in the first embodiment. Specifically, in this embodiment, the web browser 421 and the HTTP server 422 are provided separately in two apparatuses 401 and 402 connected via the local network 410, respectively, instead of being provided in a single apparatus.

Figure 13:
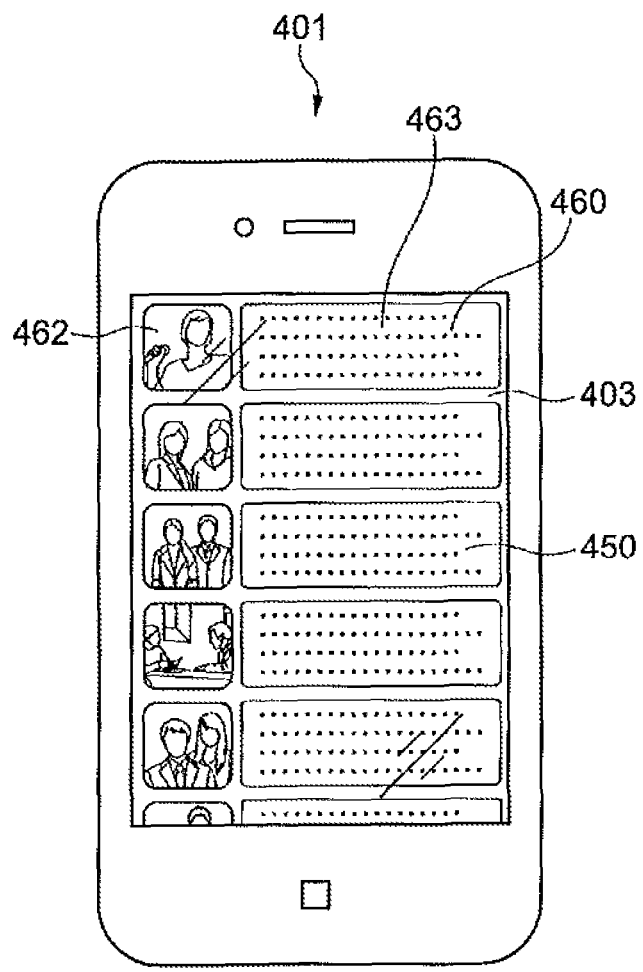
FIG. 13 is a schematic diagram showing a mobile terminal, for explaining an example of an operation of the information processing system shown in FIG. 12.

An example of an operation of the information processing system 490 structured as described above will be described. FIG. 13 is a schematic diagram showing the mobile terminal 401, for explaining the operation.

A user using the mobile terminal 401 makes an instruction to execute an application of the present disclosure. As a result, an application program is downloaded to the mobile terminal 401 from a predetermined server on the Internet 10.

The web browser 421 of the mobile terminal 401 displays a display image 450 on a display 403 of the mobile terminal 401 based on the program. It should be noted that a predetermined request may be transmitted from the web browser 421 to the HTTP server 422 of the information processing terminal 402 when generating the display image 450.

FIG. 13 schematically shows an example of the display image 450. Here, a list 460 of other programs is displayed on the display 403. The list 460 includes thumbnail images 462 of other programs and information 463 (title etc.) on the programs.

The list 460 is displayed as a user viewing a program displayed in a display area (not shown) of the display image 450 scrolls the display image 450. The scroll operation is made by a touch operation to the display 403, for example. Alternatively, the list 460 may be displayed when a predetermined button or the like is pressed.

In this embodiment, URLs of websites of programs are linked to the information 463 of the respective programs. The websites are provided by predetermined servers 300 on the Internet 10. Therefore, the information 463 of the programs corresponds to the second information. When the information 463 is clicked, a website of the corresponding program is displayed on the display 403 of the mobile terminal 401.

A URL for accessing the HTTP server 422 of the information processing terminal 402 is linked to the thumbnail images 462 of the programs. The URL includes, for example, an IP address of the information processing terminal 402. In this embodiment, the URL includes a name of API used in the channel switch processing.

When the thumbnail images 462 of the programs are clicked, a request for the channel switch processing is transmitted to the HTTP server 422 of the information processing terminal 402 based on the hyperlinked URL. The request is transmitted via the local network 410.

The HTTP server 422 that has received the request interprets the URL and hands over the processing to a predetermined plug-in. Then, the plug-in requests a tuning module of the information processing terminal 402 to execute a tuning operation.

A result of the tuning processing by the tuning module is returned to the HTTP server 422. Then, the processing result is transmitted from the HTTP server 422 to the web browser 421 via the local network 410. The web browser 421 that has received the processing result executes predetermined information processing based on the tuning result.

As described above, the information processing terminal 402 that executes the first information processing and the mobile terminal 401 capable of generating the display image 450 and requesting the information processing terminal 402 and the servers 300 to execute information processing may be connected via the local network 410. As a result, operability of the user using the mobile terminal 401 can be improved.

It should be noted that the information processing terminal 402 may include the web browser 221 described in the first embodiment. In other words, the information processing terminal 402 may operate as the information processing apparatus 200 described in the first embodiment.

Examples of the mobile terminal 401 include a cellular phone terminal such as a smartphone and various PDAs (Personal Digital Assistants) such as a tablet terminal. However, the apparatus used as the second information processing terminal is not limited to the portable terminal. For example, a PC may be used.

<Modified Example>

The embodiment of the present disclosure is not limited to the embodiments described above and can be variously modified.

Figure 14:
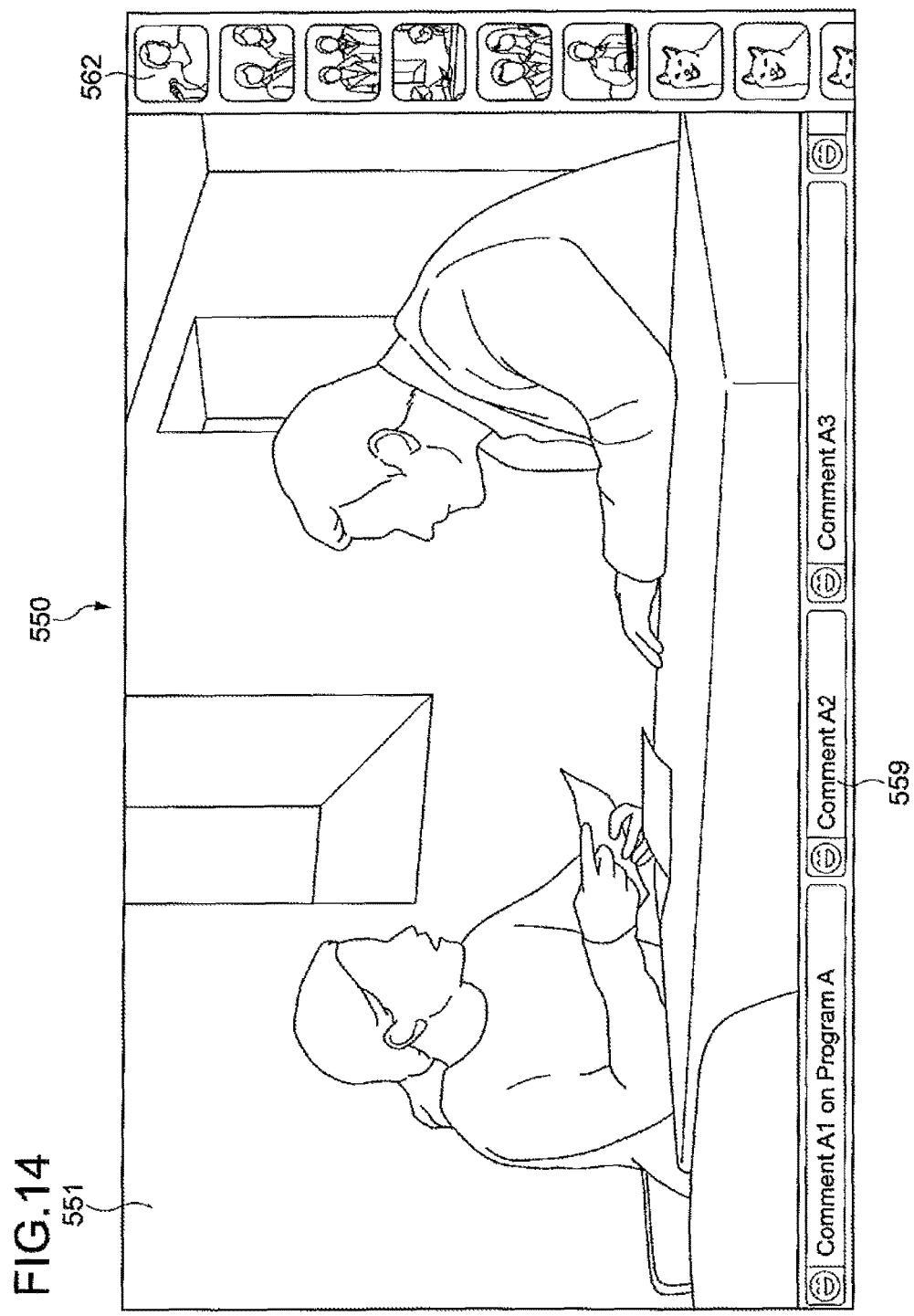
FIG. 14 is a schematic diagram showing a modified example of the display image shown in FIG. 4.

For example, FIG. 14 is a schematic diagram showing a modified example of the display image 50 shown in FIG. 4. The display image 550 has a larger display area 551 in which a program is displayed than the display image 50 shown in FIG. 4. Below the display area 551, comments 559 on Program A are displayed as the second information. On a right-hand side of the display area 551, thumbnail images 562 of programs are displayed as the first information.

The structure of the display image can be set as appropriate as described above. For example, assuming that a predetermined time or more during which a user operation is not input has continued while the display image 50 is being displayed in the first embodiment, the display image 50 shown in FIG. 4 may be automatically switched to the display image 550 of the modified example. The state where an operation is not input is highly likely a state where a program is being viewed. Therefore, by displaying the display image 550 of the modified example, a program can be sufficiently viewed, with the result that operability is improved. It should be noted that the display image may be switched when a predetermined button or the like is pressed.

In the descriptions above, the display image has been generated as a webpage. However, the display image is not limited to a webpage and may be generated as a screen of an OS or an application. Specifically, the display image only needs to be an image in which access information for accessing a server on the global network and access information for accessing its own execution unit (CPU etc.) exist. It should be noted that the access information is also not limited to the URL.

When a hyperlink in the display image is clicked, a page often jumps to a different page, though not limited thereto. For example, a window for inputting a comment is displayed on the display image, and a comment is input to the window. When a posting button is clicked, the comment is transmitted to a server linked to the posting button. In this case, the posted comment is displayed, but the screen does not jump to a different page.

The present disclosure is not limited to the case where information on a hyperlink destination is statically stored in a predetermined server in advance. For example, a page that displays comments of other users that have been posted in real time is generated when the hyperlink is clicked. Alternatively, a page of the hyperlink destination and the like may be generated dynamically by a script and the like.

A predetermined program may be executed when a UI on the display image is clicked, and a hyperlink destination may be determined based on the execution result. Specifically, to which server an inquiry or request is to be transmitted may be undetermined before the UI is clicked. In other words, which of the first information and the second information the UI is may be undetermined before the UI is clicked. The UI becomes the first information when the UI is clicked and a hyperlink to the internal HTTP server or the like is set. The UI becomes the second information when the UI is clicked and a hyperlink to a server on the Internet is set.

Another example of the first information processing executed by the internal HTTP server 222 of the first embodiment and the HTTP server 422 of the information processing terminal of the second embodiment will be described.

For example, as the information processing apparatus according to the embodiment of the present disclosure, an apparatus connected to a BD recorder or the like or an apparatus including a BD recorder or the like may be used. In this case, information on a BD currently loaded in a recorder, or the like may be detected in response to a request from a web browser. In other words, BD information detection processing may be executed as the first information processing. The information on a BD may be detected when a request is made by the web browser, or the information on a BD may be stored when the disc is loaded so that the information is read out from the disc.

For example, as the embodiment of the present disclosure, an information processing apparatus including a functional block that functions as a log uploader may be used. By the log uploader, a reproduction log of a channel being viewed, a user operation log, and the like are uploaded to a predetermined server. Control of the log uploader and the like may be executed by the HTTP server or the like as the first information processing, the example of which is predetermined log deletion processing.

In the descriptions above, the HTTP server has been taken as an example of the execution unit, and the web browser has been taken as an example of the generation unit and the first and second request units. However, the present disclosure is not limited thereto, and other software and hardware may be used instead. Moreover, the generation unit and the first and second request units may be provided separately.

In the descriptions above, information on a program being viewed has been acquired, and information related to the program being viewed has been displayed in the display image based on the acquired information. However, the present disclosure is not necessarily limited thereto. For example, there is a case where the information on a program being viewed is not used, and the information related to the program is not acquired. In this case, information preset as a recommended program or music, information on a weather forecast, and the like may be displayed in the display image. In addition, a hyperlink may be set to the information as appropriate.

It is also possible to use a moving image content delivery service provided by a server on the Internet and display the delivered moving image content in the display image. For example, the moving image content is hyperlinked to the server.

In the descriptions above, comments posted by other users have been displayed in the display image. Alternatively, programs being viewed by other users, programs recommended by other users, and the like may be displayed in the display image. Alternatively, information onto which profiles, preference information, relationships with friends, and recommended contents of other users are reflected may be displayed in the display image. Moreover, chats with other users may be enabled to be performed in the display image.

In the descriptions above, HTTP has been used as the communication protocol. However, the present disclosure is not limited thereto, and other protocols or communication methods may be used instead. Similarly, the protocol for hyperlinks is also not limited to HTTP and may be any protocol as long as a request can be made to other servers (computers).

In the descriptions above, content data of a program delivered from a broadcast station has been received by the tuner unit, and the broadcast program has been displayed in the display image. However, the embodiment of the present disclosure is of course not limited to the case where a program is viewed. For example, reproduction of music recorded onto a recording medium such as a CD and a use of a network service associated with the music reproduction may be realized with high operability. Alternatively, viewing of photographed digital photos, pictures, and the like and a use of a network service associated with the viewing may be realized with high operability.

It should be noted that the present disclosure may also take the following structures.

(1) An information processing apparatus, including:
an execution unit capable of executing first information processing;
a generation unit configured to generate a display image including first information associated with first access information for accessing the execution unit and second information associated with second access information for accessing a server on a global network, the server being capable of executing second information processing;
a first request unit configured to request the execution unit to execute the first information processing based on the first access information associated with the first information; and
a second request unit configured to request the server to execute the second information processing based on the second access information associated with the second information.

(2) The information processing apparatus according to (1), further including
a broadcast signal processor configured to receive a program of a channel selected from a plurality of channels by a user and output the program,
in which the display image includes a display area for displaying the program, and
in which the first information processing includes switch processing of the channels.

(3) The information processing apparatus according to (1) or (2),
in which the first information processing includes analysis processing for music that is being played in the program.

(4) The information processing apparatus according to any one of (1) to (3),
in which the first access information and the second access information are each a URL (Uniform Resource Locator).

It should be understood by those skilled in the art that various modifications, combinations, sub-combinations and alterations may occur depending on design requirements and other factors insofar as they are within the scope of the appended claims or the equivalents thereof.

What is claimed is:

1. A television receiver, comprising:
an execution unit capable of executing first information processing;
a generation unit configured to generate a display image including first information associated with first access information for accessing the execution unit and second information associated with second access information for wirelessly accessing a server on a global network, the server being capable of executing second information processing;
a first request unit configured to request the execution unit to execute the first information processing based on the first access information associated with the first information; and
a second request unit configured to wirelessly request the server to execute the second information processing based on the second access information associated with the second information,
the execution unit is an internal HTTP (Hyper Text Transfer Protocol) server arranged in the television receiver,
the first access information is a first URL (Uniform Resource Locator) and the second access information is a second URL,
the display image generated by the generation unit is represented as a single webpage described in HTML (Hyper Text Markup Language) which includes a first hyperlink to the first URL of the internal HTTP server and a second hyperlink to the second URL of the server on the global network, in which an indication that the first hyperlink is associated with access to the internal HTTP server and an indication that the second hyperlink is associated with wireless access to the server on the global network are nonexistent on the display image such that a user is unable to determine from the display image that the first hyperlink is associated with access to the internal HTTP server and that the second hyperlink is associated with wireless access to the server on the global network, and the display image generated by the generation unit and represented as the single webpage includes a display area to display a currently selected program, an information area to display information pertaining to the currently selected program, and a list area to display a list of other available programs, in which the information in the information area has the first hyperlink and each program within the list of other available programs has a respective second hyperlink, such that when the display image is displayed on a display screen the currently selected program, the information pertaining to the currently selected program having the first hyperlink to the first URL of the internal HTTP server, and the list of other available programs having respective second hyperlinks to respective second URLs of the server on the global network are simultaneously displayed, wherein a web browser of the television receiver requests that the internal HTTP server of the television receiver execute the first information processing in response to a user selecting the first hyperlink to the first URL, and requests that the server execute the second information processing in response to a user selecting the second hyperlink to the second URL, and wherein when the first information processing is channel switch processing, and the execution unit successfully executes detection processing of the switched-to channel, the television receiver acquires, via the global network, information related to a program that is currently broadcast on the switched-to channel and displays the acquired information in the information area.

2. An information processing method for use with a television receiver, comprising:

executing, by an execution unit, first information processing;

generating, by a generation unit, a display image including first information associated with first access information for accessing the execution unit and second information associated with second access information for wirelessly accessing a server on a global network, the server being capable of executing second information processing;

requesting, by a first request unit, the execution unit to execute the first information processing based on the first access information associated with the first information; and wirelessly requesting, by a second request unit, the server to execute the second information processing based on the second access information associated with the second information, the execution unit is an internal HTTP (Hyper Text Transfer Protocol) server arranged in the television receiver, the first access information is a first URL (Uniform Resource Locator) and the second access information is a second URL, and the display image generated by the generation unit is represented as a single webpage described in HTML (Hyper Text Markup Language) which includes a first hyperlink to the first URL of the internal HTTP server and a second hyperlink to the second URL of the server on the global network, in which an indication that the first hyperlink is associated with access to the internal HTTP server and an indication that the second hyperlink is associated with wireless access to the server on the global network are nonexistent on the display image such that a user is unable to determine from the display image that the first hyperlink is associated with access to the internal HTTP server and that the second hyperlink is associated with wireless access to the server on the global network, and the display image generated by the generation unit and represented as the single webpage includes a display area to display a currently selected program, an information area to display information pertaining to the currently selected program, and a list area to display a list of other available programs, in which the information in the information area has the first hyperlink and each program within the list of other available programs has a respective second hyperlink, such that when the display image is displayed on a display screen the currently selected program, the information pertaining to the currently selected program having the first hyperlink to the first URL of the internal HTTP server, and the list of other available programs having respective second hyperlinks to respective second URLs of the server on the global network are simultaneously displayed, wherein a web browser of the television receiver requests that the internal HTTP server of the television receiver execute the first information processing in response to a user selecting the first hyperlink to the first URL, and requests that the server execute the second information processing in response to a user selecting the second hyperlink to the second URL, and wherein when the first information processing is channel switch processing, and the execution unit successfully executes detection processing of the switched-to channel, the television receiver acquires, via the global network, information related to a program that is currently broadcast on the switched-to channel and displays the acquired information in the information area.

3. A non-transitory computer readable medium having stored thereon a program that causes a computer to function as:

an execution unit capable of executing first information processing;

a generation unit configured to generate a display image including first information associated with first access information for accessing the execution unit and second information associated with second access information for wirelessly accessing a server on a global network, the server being capable of executing second information processing;

a first request unit configured to request the execution unit to execute the first information processing based on the first access information associated with the first information; and a second request unit configured to wirelessly request the server to execute the second information processing based on the second access information associated with the second information, the execution unit is an internal HTTP (Hyper Text Transfer Protocol) server arranged in a television receiver, the first access information is a first URL (Uniform Resource Locator) and the second access information is a second URL, and the display image generated by the generation unit is represented as a single webpage described in HTML (Hyper Text Markup Language) which includes a first hyperlink to the first URL of the internal HTTP server and a second hyperlink to the second URL of the server on the global network, in which an indication that the first hyperlink is associated with access to the internal HTTP server and an indication that the second hyperlink is associated with wireless access to the server on the global network are nonexistent on the display image such that a user is unable to determine from the display image that the first hyperlink is associated with access to the internal HTTP server and that the second hyperlink is associated with wireless access to the server on the global network, and the display image generated by the generation unit and represented as the single webpage includes a display area to display a currently selected program, an information area to display information pertaining to the currently selected program, and a list area to display a list of other available programs, in which the information in the information area has the first hyperlink and each program within the list of other available programs has a respective second hyperlink, such that when the display image is displayed on a display screen the currently selected program, the information pertaining to the currently selected program having the first hyperlink to the first URL of the internal HTTP server, and the list of other available programs having respective second hyperlinks to respective second URLs of the server on the global network are simultaneously displayed, wherein a web browser of the computer requests that the internal HTTP server of the computer execute the first information processing in response to a user selecting the first hyperlink to the first URL, and requests that the server execute the second information processing in response to a user selecting the second hyperlink to the second URL, and wherein when the first information processing is channel switch processing, and the execution unit successfully executes detection processing of the switched-to channel, the computer acquires, via the global network, information related to a program that is currently broadcast on the switched-to channel and displays the acquired information in the information area.

4. The television receiver according to claim 1, in which the generation unit is further configured to automatically switch the display image to a modified display image upon occurrence of a predetermined event.

5. The television receiver according to claim 4, in which the predetermined event is a passage of a predetermined amount of time without an input from the user.

6. The television receiver according to claim 5, further comprising a broadcast signal processor configured to receive the currently selected program of a channel selected from a plurality of channels by the user and output the program for display in the display area in the display image, and in which when the generation unit automatically switches the display image to the modified display image, the currently selected program is caused to be displayed in a second display area of the modified display image, in which the second display area has a size larger than that of the display area of the previous non-modified display image.

* * * * *